US012414040B2

(12) United States Patent
Javaudin et al.

(10) Patent No.: US 12,414,040 B2
(45) Date of Patent: Sep. 9, 2025

(54) SWITCHING BETWEEN PHYSICAL ACCESS POINTS SHARING THE SAME VIRTUAL ACCESS POINT IDENTIFIER

(71) Applicant: Orange, Issy-les-Moulineaux (FR)

(72) Inventors: Jean-Philippe Javaudin, Chatillon (FR); Jean-Michel Bonnamy, Chatillon (FR); José Saldana, Chatillon (FR); José Ruiz Mas, Chatillon (FR); Julian Fernandez Navajas, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 373 days.

(21) Appl. No.: 17/786,895

(22) PCT Filed: Dec. 14, 2020

(86) PCT No.: PCT/FR2020/052405
§ 371 (c)(1),
(2) Date: Jun. 17, 2022

(87) PCT Pub. No.: WO2021/123582
PCT Pub. Date: Jun. 24, 2021

(65) Prior Publication Data
US 2023/0034345 A1 Feb. 2, 2023

(30) Foreign Application Priority Data
Dec. 20, 2019 (FR) ...................................... 1915206

(51) Int. Cl.
*H04W 36/18* (2009.01)
*H04W 8/22* (2009.01)
*H04W 48/18* (2009.01)
(52) U.S. Cl.
CPC ............ *H04W 48/18* (2013.01); *H04W 8/22* (2013.01)

(58) Field of Classification Search
CPC ....... H04W 8/22; H04W 48/18; H04W 72/51; H04W 48/20; H04W 84/12;
(Continued)

(56) References Cited

U.S. PATENT DOCUMENTS 9,602,230 B2 * 3/2017 Roman ................ H04B 7/0626
2014/0105050 A1 4/2014 Kang et al.
(Continued)

FOREIGN PATENT DOCUMENTS

WO WO-2015105985 A1 * 7/2015 ......... H04L 41/0806

OTHER PUBLICATIONS

International Search Report dated Mar. 22, 2021 for corresponding International Application No. PCT/FR2020/052405, Dec. 14, 2020.
(Continued)

*Primary Examiner* — Mewale A Ambaye
(74) *Attorney, Agent, or Firm* — David D. Brush; Westman, Champlin & Koehler, P.A.

(57) ABSTRACT

A method for managing switching of a terminal between a plurality of physical access points to a Wi-Fi network, a virtual access point identifier dedicated to the terminal being assigned by a controller to a first physical access point, the terminal associating with the first physical access point by a first connection using the virtual access point identifier. The method includes at the first access point: transmitting, from the first physical access point to the controller, information relating to the capabilities of the terminal, receiving an order to switch from the first connection to a second connection established between the terminal and a second physical access point of the plurality using the same virtual access point identifier, the first and the second connections being adapted to the capabilities of the terminal.

13 Claims, 4 Drawing Sheets

(58) Field of Classification Search
CPC ............. H04W 74/0833; H04W 36/16; H04W 36/0064; H04W 36/302; H04W 36/26
See application file for complete search history.

(56) References Cited

U.S. PATENT DOCUMENTS

| | | | |
|---|---|---|---|
| 2014/0126403 A1* | 5/2014 | Siomina | H04J 11/005 |
| | | | 370/252 |
| 2015/0373626 A1* | 12/2015 | Yi | H04W 74/0833 |
| | | | 375/132 |
| 2016/0192261 A1* | 6/2016 | Wang | H04W 36/16 |
| | | | 370/331 |
| 2016/0330077 A1 | 11/2016 | Jin et al. | |
| 2020/0350969 A1* | 11/2020 | Shimezawa | H04B 7/0626 |
| 2020/0396025 A1* | 12/2020 | Sun | H04L 1/1664 |
| 2021/0075542 A1* | 3/2021 | Kneckt | H04L 1/0061 |
| 2021/0091887 A1* | 3/2021 | Cho | H04L 1/0061 |

OTHER PUBLICATIONS

Written Opinion of the International Searching Authority dated Mar. 22, 2021 for corresponding International Application No. PCT/FR2020/052405, filed Dec. 14, 2020.

English translation of the Written Opinion of the International Searching Authority dated Mar. 30, 2021 for corresponding International Application No. PCT/FR2020/052405, filed Dec. 14, 2020.

Alfoudi et al., "Traffic Management in LTE-Wi-Fi Slicing Networks", pp. 268-273, dated 2017.

European Notification under Article 94(3) EPC dated Apr. 4, 2025 for corresponding European Application No. 20 845 189.8.

\* cited by examiner

SWITCHING BETWEEN PHYSICAL ACCESS POINTS SHARING THE SAME VIRTUAL ACCESS POINT IDENTIFIER

CROSS-REFERENCE TO RELATED APPLICATIONS

This Application is a Section 371 National Stage Application of International Application No. PCT/FR2020/052405, filed Dec. 14, 2020, which is incorporated by reference in its entirety and published as WO 2021/123582 A1 on Jun. 24, 2021, not in English.

1. FIELD OF THE INVENTION

The invention relates to the field of Wi-Fi networks, and more particularly to the field of a Wi-Fi network using a virtual access point (LVAP) managed by an SDN network controller (SDN being the acronym of software defined networking).

2. PRIOR ART

One advantage of a virtual access point is that it allows a terminal (also called a station) to switch between two physical Wi-Fi access points (APs) in a way that is transparent to the terminal, simply by transferring, from the starting AP to the end AP, the LVAP virtual-access-point identifier, with its characteristics, its routing rules, and the attachment of the terminal. The fact that the terminal does not need to reassociate with the new physical AP may however cause problems. Specifically, the concordance between the capabilities of the station and the capabilities of the new physical AP may be broken if the various physical APs of the network do not have identical capabilities.

This is for example the case when a Wi-Fi network consists of a plurality of heterogeneous Wi-Fi APs certain of which support Wi-Fi 4 but others of which support Wi-Fi 5, or when the maximum bandwidth supported by certain APs is 80 MHz and 160 MHz is supported by others.

Figure 1:
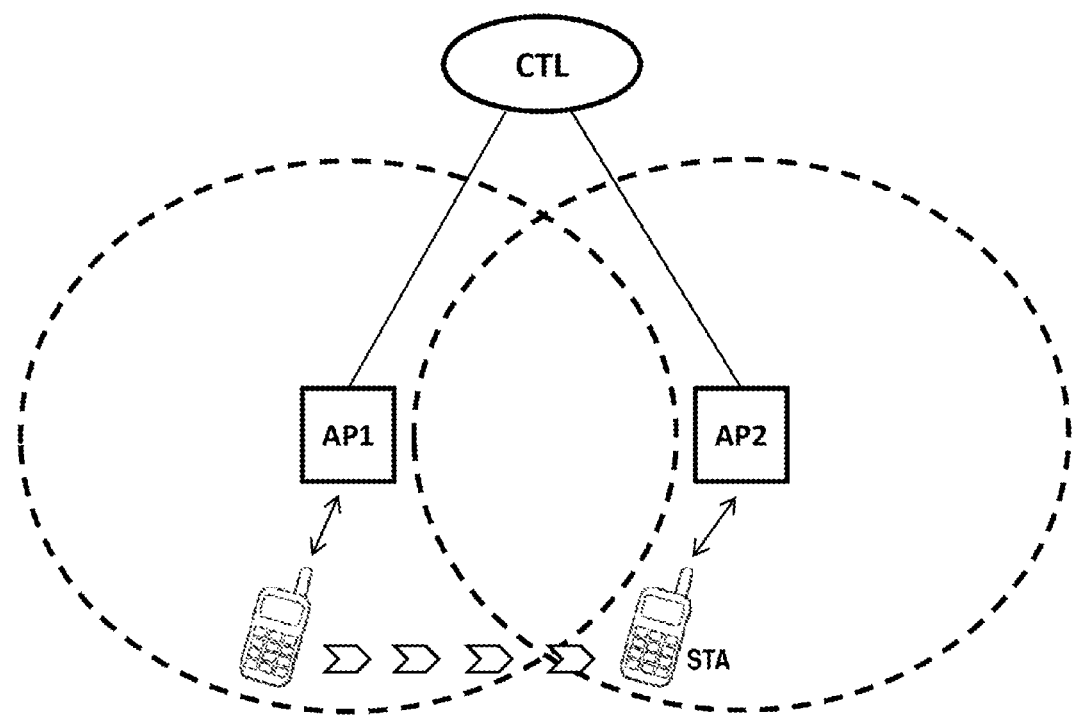

FIG. 1 illustrates a simple example of a Wi-Fi network with 2 access points AP1 and AP2. AP1 supports Wi-Fi 5 (radio standard IEEE 802.11ac), in the 5 GHz band with a maximum bandwidth of 80 MHz. AP2 also supports Wi-Fi 5 in the 5 GHz band, but with a maximum bandwidth of 160 MHz (this functionality is optional in the standard IEEE 802.11ac).

A Wi-Fi station (STA), supporting 160 MHz Wi-Fi 5, connects to this network. The following 2 cases may then arise.

If a Wi-Fi station (STA) first associates with AP1, the connection will be set up with a bandwidth of 80 MHz. Subsequently, as illustrated in FIG. 1, if the station moves away from AP1 and approaches AP2, its Wi-Fi connection will end up being handed over from AP1 to AP2. During this station-transparent handover, the station will not seek to reassociate itself and the connection will not switch to 160 MHz, which would however have been possible due to the respective functionalities of AP2 and of the station STA. The resulting quality from which the station benefits is lower, but the connection will nonetheless continue to work.

In contrast, if the station STA first associates with AP2 and then switches to AP1, the connection will be set up with a bandwidth of 160 MHz. During the station-transparent handover, the station will not seek to reassociate itself and it will continue to transmit with a bandwidth of 160 MHz. As this functionality is not supported by AP1, the connection will be broken, causing a service interruption. The station STA will reinitiate connection after a delay that may range from several hundred ms to several seconds.

The publication "Traffic Management in LTE-Wi-Fi Slicing Networks", by A. S. D. Alfoudi et al., IEEE 2017, discloses a physical access point that periodically communicates the status of its connections to the controller. This allows the controller CTL to determine whether the strength of the signal received by this access point from a station connected to this access point has dropped below a certain threshold, the quality of communications routed through this access point to the station possibly being endangered should this be the case. However, the controller may trigger a handover of the station to another physical access point, simply by transferring the LVAP identifier, which is already known by the station, from the first access point to the second. Nevertheless, this method does not prevent the aforementioned drawbacks.

One of the aims of the invention is to remedy these drawbacks of the prior art.

3. SUMMARY OF THE INVENTION

The invention improves the situation by means of a method for managing handover of a terminal between a plurality of physical points of access to a Wi-Fi network, a virtual-access-point identifier dedicated to the terminal being assigned by a controller to a first physical access point, the terminal associating itself with the first physical access point via a first connection using the virtual-access-point identifier, the method comprising in the first access point:

transmitting, from the first physical access point to the controller, information relating to the capabilities of the terminal, receiving an order to hand over from the first connection to a second connection set up between the terminal and a second physical access point of the plurality using the same virtual-access-point identifier, the first and second connections being tailored to the capabilities of the terminal.

The determined criterion for handover of a terminal from the first access point to a second is, for example, an excessively low strength of the signal between the terminal and the first access point. This strength is measured by the access point, which may for example communicate it periodically to the controller. In a virtual-access-point context, when the controller decides to hand over the terminal to a second physical access point that is preferable to the first, the first access point has the virtual-access-point identifier removed by the controller, which assigns it to the second physical access point. Thus, the terminal continues to transmit its data frames with the same recipient identifier, and does not see that the physical access point has changed. Advantageously, by virtue of the proposed method, and contrary to the prior art, the second connection may be set up taking into account the particular capabilities of the terminal. In the prior art, information relating to the quality of the current connection could be transmitted to the controller, but no information specific to the terminal itself was transmitted.

In the present text, by "capability" of a terminal or of an access point, what is meant is any property, functionality or software or physical configuration present in the terminal or in the access point and having an impact on the quality of its operation.

According to one aspect of the invention, the managing method comprises extracting information relating to the capabilities of the terminal from a probe-request message sent by the terminal and received by the first physical access point.

During the phase of association between the terminal and the physical access point, a probe-request message is transmitted by the terminal, in a known manner. This message contains the terminal capabilities that the physical access point needs to know in order to optimally set up the connection between the terminal and itself.

According to one aspect of the invention, the managing method comprises extracting information relating to the capabilities of the terminal from an association-request message sent by the terminal and received by the first physical access point.

During the phase of association between the terminal and the physical access point, an association-request message is transmitted by the terminal, in a known manner. This message contains the terminal capabilities that the terminal has selected to best match those of the physical access point.

According to one aspect of the managing method, the information relating to the capabilities of the terminal is transmitted to the controller in a message requesting creation of a virtual access point.

Reception of a probe request by the first access point triggers the transmission of a request, by the first access point, to the controller, in order to obtain a virtual-access-point identifier dedicated to the terminal. Advantageously, it is in this request that the parameters relating to the capabilities of the terminal are transmitted.

According to one aspect of the invention, the managing method comprises reconfiguring the first connection prior to the handover if the capabilities of the second physical access point are inferior to those of the first.

By virtue of this aspect, for example, if the first connection, set up according to the best common capabilities between the terminal and the first physical access point, is set up at 160 MHz, and the second physical access point is only able to handle 80 MHz, the second connection is not interrupted. Specifically, before the handover, the first connection is modified to switch from the 160 MHz band to the 80 MHz band, this preventing the terminal, to which the handover is transparent, from transmitting data frames at 160 MHz to the second physical access point, which is unable to receive them, which would inevitably interrupt the connection and force the terminal to restart the procedure of association with a physical access point.

In the present text, by "inferior capability" and "superior capability", what is meant is a capability resulting in a lower and higher quality of operation of the equipment in question, respectively.

According to one aspect of the invention, the managing method comprises reconfiguring the second connection following the handover if the capabilities of the second physical access point are superior to those of the first.

By virtue of this aspect, for example, if the first connection, set up according to the best common capabilities between the terminal and the first physical access point, is set up at 80 MHz, and the second physical access point is able to handle 160 MHz, the second connection does not remain stuck at 80 MHz. Specifically, after the handover, the second connection is modified to switch from the 80 MHz band to the 160 MHz band, this increasing the quality of the connection permitted by the capabilities of the terminal.

The invention also relates to a method for controlling handover of a terminal between a plurality of physical points of access to a Wi-Fi network, a virtual-access-point identifier dedicated to the terminal being assigned by a controller to a first physical access point, the terminal associating itself with the first physical access point via a first connection using the virtual-access-point identifier, the method comprising in the controller:
  receiving, from the first physical access point, information relating to the capabilities of the terminal,
  and, depending on a determined criterion, triggering handover from the first connection to a second connection set up between the terminal and a second physical access point of the plurality using the same virtual access point, the first and second connections being tailored to the capabilities of the terminal.

According to one aspect of the control method, the information relating to the capabilities of the terminal is transmitted to the controller in a message requesting creation of a virtual access point sent by the first physical access point.

According to one aspect of the invention, the control method comprises sending to the first physical access point an order to reconfigure the first connection, prior to the handover if the capabilities of the second physical access point are inferior to those of the first.

According to one aspect of the invention, the control method comprises sending to the second physical access point an order to reconfigure the second connection, following the handover if the capabilities of the second physical access point are superior to those of the first.

Various aspects of the managing and control methods that have just been described may be implemented independently of one another or in combination with one another.

The invention also relates to a device for managing handover of a terminal between a plurality of physical points of access to a Wi-Fi network, a virtual-access-point identifier dedicated to the terminal being assigned by a controller to a first physical access point, the terminal associating itself with the first physical access point via a first connection using the virtual-access-point identifier, the device comprising a receiver, a transmitter, a processor and a memory coupled to the processor with instructions that are intended to be executed by the processor with a view to:
  transmitting, from the first physical access point to the controller, information relating to the capabilities of the terminal,
  receiving an order to hand over from the first connection to a second connection set up between the terminal and a second physical access point of the plurality using the same virtual-access-point identifier, the first and second connections being tailored to the capabilities of the terminal.

This device, which is able to implement all the embodiments of the handover-managing method that has just been described, is intended to be implemented in a physical access point of a Wi-Fi network.

The invention also relates to a device for controlling handover of a terminal between a plurality of physical points of access to a Wi-Fi network, a virtual-access-point identifier dedicated to the terminal being assigned by a controller to a first physical access point, the terminal associating itself with the first physical access point via a first connection using the virtual-access-point identifier, the device comprising a receiver, a transmitter, a processor and a memory coupled to the processor with instructions that are intended to be executed by the processor with a view to:
  receiving, from the first physical access point, information relating to the capabilities of the terminal,
  storing said information in memory, and, depending on a determined criterion, triggering handover from the first connection to a second connection set up between the terminal and a second physical access point of the plurality using the same virtual access point, the first and second connections being tailored to the capabilities of the terminal.

This device, which is able to implement all the embodiments of the handover-control method that has just been described, is intended to be implemented in an SDN network controller.

The invention also relates to a computer program comprising instructions that, when these instructions are executed by a processor, cause the latter to implement the steps of the handover-managing method, which has just been described.

The invention also relates to a data medium readable by a physical access point of a Wi-Fi network, and comprising instructions of a computer program such as mentioned above. The invention in addition relates to a computer program comprising instructions that, when these instructions are executed by a processor, cause the latter to implement the steps of the handover-control method, which has just been described.

The invention also relates to a data medium readable by a controller of an SDN network, and comprising instructions of a computer program such as mentioned above.

The abovementioned programs may use any programming language, and be in the form of source code, object code, or of intermediate code between source code and object code, such as in a partially compiled form, or in any other desirable form.

The abovementioned data media may be any entity or device capable of storing the program. For example, a medium may include a storage means, such as a ROM, for example a CD-ROM or a microelectronic circuit ROM, or else a magnetic recording means.

Such a storage means may be for example a hard disk, a flash memory, etc.

Moreover, a data medium may be a transmissible medium such as an electrical or optical signal, which may be routed via an electrical or optical cable, by radio or by other means. A program according to the invention may in particular be downloaded from a network such as the Internet.

Alternatively, a data medium may be an integrated circuit into which a program is incorporated, the circuit being designed to execute or to be used in the execution of the methods in question.

4. PRESENTATION OF THE FIGURES

Figure 2:
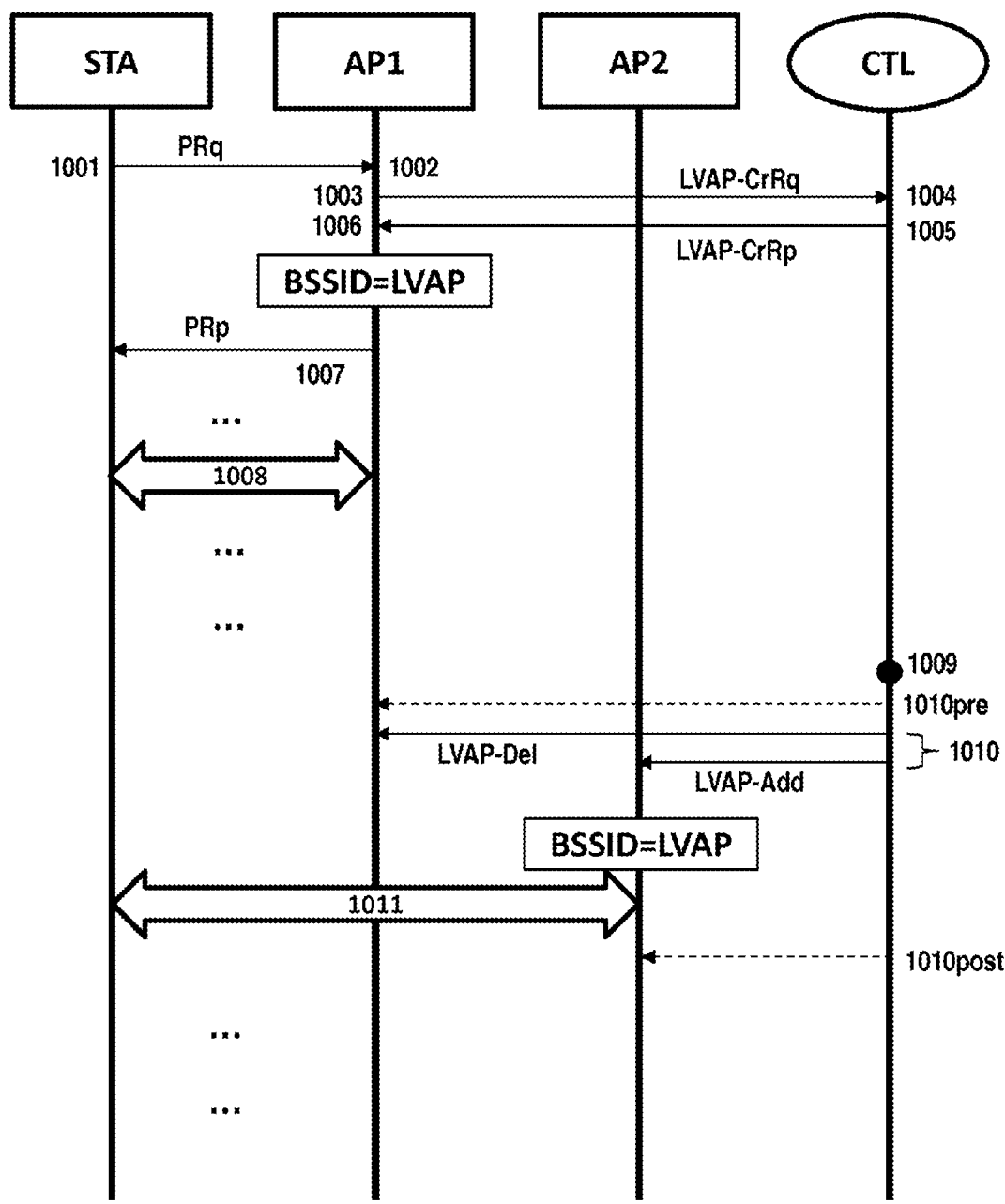
Figure 3:
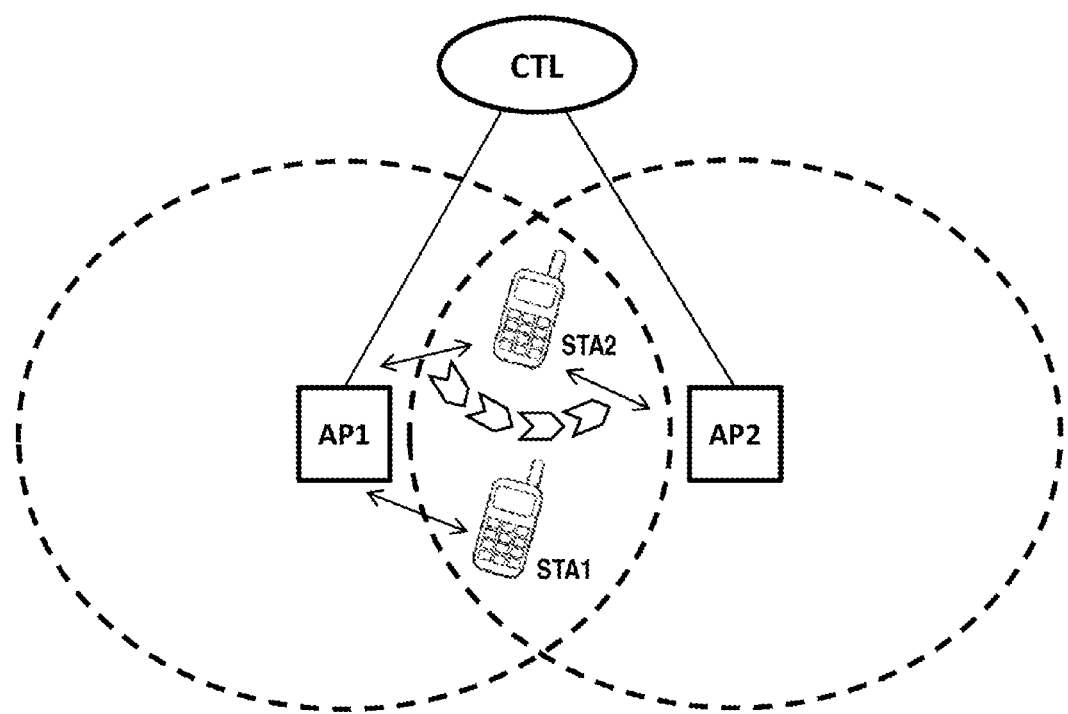
Figure 4:
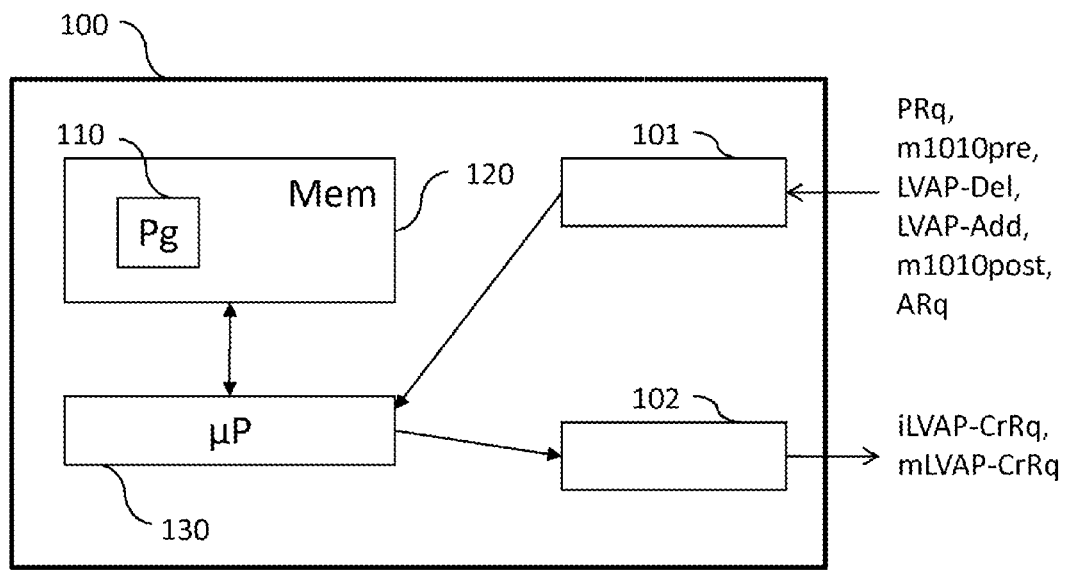
Figure 5:
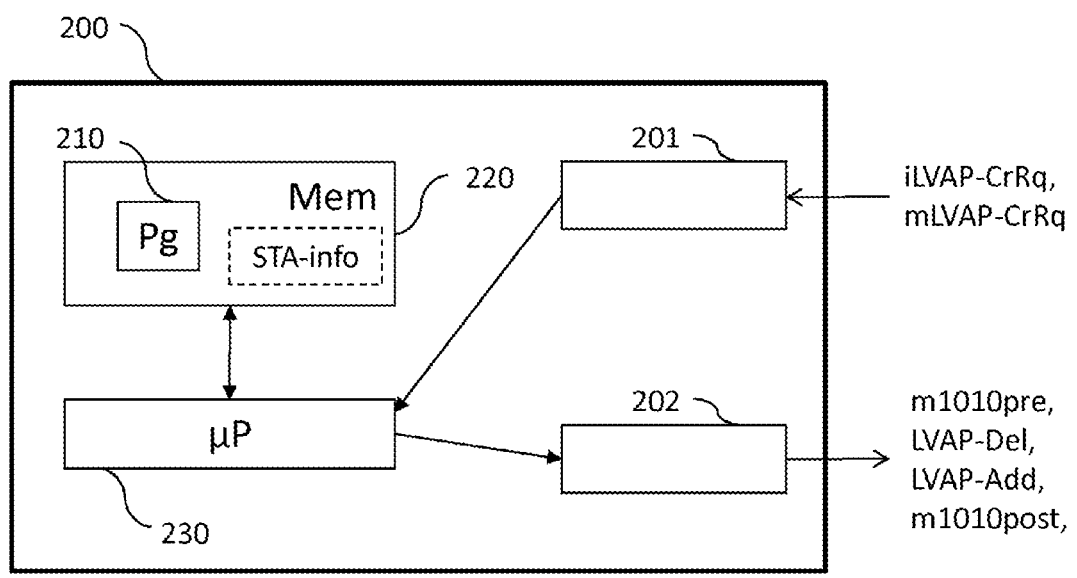

Other advantages and features of the invention will become more clearly apparent on reading the following description of one particular embodiment of the invention, which embodiment is given by way of simple illustrative and non-limiting example, and the appended drawings, in which:

FIG. 1 schematically presents a first example of a Wi-Fi network using one virtual access point and two physical access points, FIG. 2 shows an example of implementation of the methods for managing and controlling handover of a terminal between physical access points in a Wi-Fi network using a virtual access point, according to one aspect of the invention, FIG. 3 schematically shows a second example of a Wi-Fi network using a virtual access point and two physical access points, FIG. 4 shows an example of the structure of a managing device implementing the method for managing handover of a terminal between physical access points in a Wi-Fi network using a virtual access point, according to one aspect of the invention, FIG. 5 shows an example of the structure of a control device implementing the method for controlling handover of a terminal between physical access points in a Wi-Fi network using a virtual access point, according to one aspect of the invention.

5. DETAILED DESCRIPTION OF AT LEAST ONE EMBODIMENT OF THE INVENTION

In the remainder of the description, examples of embodiments of the invention based on a so-called Wi-Fi network will be presented, but it will be understood that the invention is applicable to every version of the IEEE 802.11 standards.

FIG. 2 shows an example of implementation of the methods for managing and controlling handover of a terminal between physical access points in a Wi-Fi network using a virtual access point, according to one aspect of the invention.

It is known that when a station associates with a Wi-Fi access point, parameters describing station-specific capabilities are included in 2 types of messages that it sends: probe request and association request. An access point that receives a probe request responds, using a probe-response message, with its own parameters, which describe its own capabilities, this allowing the station to indicate in the association request the subset of its parameters that it wants to use to associate with this access point.

In a step 1001, the terminal STA being in proximity to the physical access point AP1, it sends a probe request PRq containing parameters among the following parameters, which constitute information relating to the capabilities of the terminal:
 "HT capabilities" for 802.11n;
 "VHT capabilities" for 802.11ac;
 "HE capabilities" for 802.11ax;
 the MAC address MAC of the terminal STA.

In a step 1002, the access point AP1 receives the request PRq and extracts the above parameters therefrom.

The access point AP1, just like the access point AP2, forms part of a plurality of access points of an SDN Wi-Fi network, in which each access point is connected to an SDN network controller, which is here called CTL.

In a step 1003, the access point AP1 transmits, to the controller CTL, a request LVAP-CrRq to create a virtual access point, this request containing an SSID of AP1 and the MAC address of the terminal STA, in order to allow the controller CTL to create, for the access point AP1, an access-point identifier LVAP that is unique to the terminal STA. Advantageously, and unlike the prior art, the request LVAP-CrRq also contains parameters representative of the capabilities of the terminal STA, which parameters were extracted in step 1002.

In a step 1004, the controller CTL receives the request LVAP-CrRq to create a virtual access point, and stores in memory, in a table or a register STA-info, the parameters representative of the capabilities of the terminal STA, which is identified by its MAC address. In this step, the controller also creates a virtual-access-point identifier LVAP of BSSID type, said identifier being dedicated to the terminal STA and unique thereto. For example, the identifier LVAP is formed on the basis of the first 3 bytes of the MAC address of the physical access point and of the last 3 bytes of the MAC address of the terminal STA, and/or is the product of a hash of the MAC address of the terminal STA, the most important thing being that the identifier LVAP is unique in the network of the Wi-Fi network.

In a step 1005, the controller CTL responds to the access point AP1 by sending it a message LVAP-CrRp containing the identifier LVAP. The access point AP1 receives this message in a step 1006, and assigns itself the identifier LVAP by way of BSSID.

In a step 1007, the access point AP1 sends its response PRp to the probe request received in step 1002. The response PRq contains the BSSID assigned to the access point AP1, which is the LVAP. The terminal receives this response and may then use this BSSID.

There follow exchanges between the terminal STA and the access point AP1, which are known and not illustrated, and which are carried out with a view to authenticating the terminal STA and associating it with the access point AP1. By virtue of these exchanges, in a step 1008, the terminal STA is associated with the physical access point AP1 with LVAP as BSSID. Optionally, during this phase, the physical access point AP1 may extract information relating to the capabilities of the terminal STA from an association-request message sent by the latter. The physical access point AP1 may then transmit them to the controller CTL so that it knows the configuration used for the connection between the terminal STA and the access point AP1.

There follows a phase of use of the access point AP1 by the terminal STA, in which phase data packets (not illustrated) are exchanged between the terminal and the network to which the access point AP1 permits access. For some of these packets, in a known manner, the access point AP1 consults the controller CTL to determine how they should be routed, for example using OpenFlow packet-in/packet-out requests/responses.

During this phase of use, in a known manner, the access point AP1 measures the quality of the connection set up with the terminal STA, for example by measuring the strength of the signal received from the terminal STA (i.e. RSSI: received signal strength indication). The access point AP1 transmits to the controller CTL one or more reports containing this measurement. Measurements other than signal strength may be used, such as radio-channel usage time, or an indicator corresponding to the load (radio-channel occupancy rate, BSS load, etc.) on the AP.

The signal emitted by the terminal STA is also measured by AP2, another Wi-Fi access point of the SDN network. The access point AP2 is configured to perform the same type of measurement as the access point AP1, and transmits the same type of measurement reports to the controller CTL.

At any time after step 1008 (in which the terminal STA is associated with the physical access point AP1 with LVAP as BSSID), on the basis of the measurement reports it has received, the controller CTL may determine, in a step 1009, that the connection between the access point AP1 and the terminal STA is no longer optimal, according to a determined handover criterion. This handover criterion is preferably related to the received measurements and to a predetermined quality threshold that a received measurement must or must not exceed. For example, the strength of the signal received from the terminal STA by the access point AP1 has dropped below −75 dBm. Other handover criteria may be used, such as a BSS load higher than 75%.

In this step 1009, the controller CTL, which has also received measurement reports from other physical access points of the SDN network, detects that the access point AP2 meets the handover criterion.

These changes in the values of the measurements used by the controller may for example simply be the result of a mobility of the terminal STA, which has moved away from the access point AP1 and got closer to the access point AP2, or the result of a more complex change in situation, such as the occurrence of radio interference in the radio channel used by the AP1, or the need to prioritize flows from another station also connected to the access point AP1.

In a step 1010 comprising a plurality of sub-steps, on the basis of the handover criterion, the controller CTL transfers, from the access point AP1 to the access point AP2, the identifier LVAP and its characteristics, its routing rules, and the attachment of the terminal. To do this, the controller CTL sends, to the access point AP1, a request LVAP-Del to delete the BSSID LVAP, and sends, to the access point AP2, a request LVAP-Add to add the BSSID LVAP. Corresponding acknowledgement messages (not illustrated) are also transmitted. The result of this step 1010 is step 1011, in which the terminal STA is still associated with the BSSID LVAP, but this BSSID is now associated with the physical access point AP2, and no longer with the physical access point AP1. In a way that is transparent to the terminal STA, the first connection between the terminal STA and the access point AP1 has handed over to a second connection between the terminal STA and the access point AP2.

One of the advantageous particularities of the invention is that the controller CTL not only knows the capabilities of the terminal STA, but also the capabilities of the various physical access points of the SDN network that it controls. The latter capabilities were for example communicated to it during the initial configuration of the SDN network of Wi-Fi access points, automatically or manually.

The controller CTL may therefore make it so that the handover takes advantage of the respective capabilities of the terminal STA and of the end access point AP2.

Three mutually exclusive cases exist. In a first case, the capabilities of the end access point are superior to those of the starting access point, and the second connection must be reconfigured, in a step 1010post. In a second case, the capabilities of the end access point are inferior to those of the starting access point, and the first connection must be reconfigured before the handover, in a step 1010pre. Lastly, in a third case, the capabilities of the two access points are equivalent, and no reconfiguration is necessary.

In the first case, after step 1010 and preferably after step 1011, step 1010post comprises sending a second-connection reconfiguration message, from the controller CTL to the access point AP2. For example, the access point AP1 may use the 80 MHz band but not the 160 MHz band, whereas the terminal STA and the access point AP2 may use both bands. The first connection therefore used the 80 MHz band. The second connection, during handover, continues to use this same band. By virtue of the message sent in the step 1010post, the second connection is reconfigured to use the 160 MHz band. In the second case, step 1010pre precedes step 1010 and comprises sending a first-connection reconfiguration message, from the controller CTL to the access point AP1. For example, the access point AP2 may use the 80 MHz band but not the 160 MHz band, whereas the terminal STA and the access point AP1 may use both bands. The first connection therefore used the 160 MHz band. The second connection, after handover, if nothing were done, would unsuccessfully attempt to use the same band and would be interrupted. By virtue of the message sent in the step 1010pre, the first connection is reconfigured, in anticipation of the handover, to use the 80 MHz band, and thus a handover without interruption is ensured.

A connection between a station and its access point may be reconfigured in a plurality of ways. If the reconfiguration consists in switching from one IEEE 802.11 standard to another, or from one version of these standards to another, the messages received by the access point or by the station are defined by these standards. For example, when ordered to do so by the controller, the access point sends a CSA message to the station (CSA standing for channel switch announcement). If the reconfiguration consists in modifying a radio channel without replacing it with another (for example in order to modify the width of the frequency band used by the access point, while remaining under the same IEEE 802.11 standard version), messages specific to the equipment in question may be necessary, such as for example an order to deactivate and reactivate OFDMA or Mu-MIMO in the antennas.

Returning to the example of FIG. 1, it will be understood that by virtue of the invention the Wi-Fi connection of a terminal that is moving between access points that have different capabilities will always remain optimal and will not be not interrupted, contrary to the prior art. There are other situations to which the invention is applicable, one example of which is illustrated in FIG. 3.

With reference to FIG. 3, initially two terminals STA1 and STA2 are associated, independently of each other, with the same physical access point AP1, each with the virtual-access-point identifier dedicated thereto (LVAP1 and LVAP2, respectively).

As in the first example, illustrated in FIG. 1, the AP1 supports Wi-Fi 5 (radio standard IEEE 802.11ac), in the 5 GHz band with a maximum bandwidth of 80 MHz (this is the minimum required by the standard IEEE 802.11ac). AP2 also supports Wi-Fi 5 in the 5 GHz band, but with a maximum bandwidth of 160 MHz (this functionality is optional in the standard IEEE 802.11ac). AP2 is disabled.

The terminal STA1 supports Wi-Fi 5 with 80 MHz, whereas the terminal STA2 supports Wi-Fi 5 with 160 MHz. Each of their respective connections to the physical access point AP1 will therefore use the 80 MHz band.

Subsequently, the access point AP2 is activated and is added to the Wi-Fi network controlled by the controller CTL. The two terminals STA1 and STA2, which have not changed position, then find themselves in the region covered by the physical access point AP2, in addition to being in the region covered by AP1. The controller CTL, by virtue of the handover-managing method according to the invention, knows the respective capabilities of the terminals STA1 and STA2, and the capabilities of the physical access point AP2. It may thus determine that the physical access point AP2 would be optimal for the terminal STA2, as it would allow it to take advantage of its ability to use the 160 MHz band, and proceeds to hand over the terminal STA2 to AP2 while keeping it associated with the BSSID LVAP2.

It will be understood that the examples that have just been described are only a few of the embodiments of the invention, and that the invention is applicable to any Wi-Fi network using a virtual access point (LVAP) managed by an SDN network controller, regardless of the number of physical access points and the number of stations (terminals, whether mobile or not) associated therewith, and regardless of the order in which physical access points are activated or disactivated.

With reference to FIG. 4, an example of the structure of a managing device implementing the method for managing handover of a terminal between physical access points in a Wi-Fi network using a virtual access point, according to one aspect of the invention, will now be described.

The managing device 100 implements the handover-managing method, various embodiments of which have just been described.

Such a device 100 may be implemented in a physical access point, such as for example the access point AP1, which is referred to as the first physical access point, or the access point AP2, which is referred to as the second physical access point.

For example, the device 100 comprises a receiver 101, a transmitter 102 and a processing unit 130, the latter for example being equipped with a microprocessor µP and controlled by a computer program 110, which is stored in a memory 120 and which implements the handover-managing method according to the invention. On initialization, the code instructions of the computer program 110 are for example loaded into a RAM memory, before being executed by the processor of the processing unit 130. Such a memory 120, such a processor of the processing unit 130, such a receiver 101 and such a transmitter 102 are able and configured to:

transmit, from the first physical access point to the controller, information iLVAP-CrRq relating to the capabilities of the terminal, receive an order LVAP-Del or LVAP-Add to hand over from a first connection between the terminal and the first physical access point to a second connection set up between the terminal and a second physical access point using the same virtual-access-point identifier, the first and second connections being tailored to the capabilities of the terminal.

Advantageously, they are also able and configured to:

extract information relating to the capabilities of the terminal from a probe-request message PRq sent by the terminal and received by the first physical access point, transmit the information relating to the capabilities of the terminal to an SDN controller in a message LVAP-CrRq requesting creation of a virtual access point, receive an order m1010pre to reconfigure the first connection prior to the handover if the capabilities of the second physical access point are inferior to those of the first, receive an order m1010post to reconfigure the second connection following the handover if the capabilities of the second physical access point are superior to those of the first.

Optionally, they are also able and configured to:

extract information relating to the capabilities of the terminal from an association-request message ARq sent by the terminal and received by the first physical access point.

With reference to FIG. 5, an example of the structure of a control device implementing the method for controlling handover of a terminal between physical access points in a Wi-Fi network using a virtual access point, according to one aspect of the invention, will now be described.

The control device 200 implements the handover-control method, various embodiments of which have just been described.

Such a device 200 may be implemented in an SDN network controller, such as the controller CTL for example.

For example, the device 200 comprises a receiver 201, a transmitter 202 and a processing unit 230, the latter for example being equipped with a microprocessor µP and controlled by a computer program 210, which is stored in a memory 220 and which implements the control method according to the invention. On initialization, the code instructions of the computer program 210 are for example loaded into a RAM memory, before being executed by the processor of the processing unit 230.

Such a memory 220, such a processor of the processing unit 230, such a receiver 201 and such a transmitter 202 are able and configured to:

receive, from the first physical access point, information iLVAP-CrRq relating to the capabilities of a terminal, store said information in memory 220, for example in a table or a register STA-Info, assign a virtual-access-point identifier to the first physical access point, which identifier is dedicated to the terminal, and, depending on a determined criterion, trigger the handover from a first connection between the terminal and the first physical access point to a second connection between the terminal and a second physical access point using the same virtual access point, the first and second connections being tailored to the capabilities of the terminal, by issuing handover orders LVAP-Del and LVAP-Add to the first physical access point and to the second physical access point, respectively.

Advantageously, they are also able and configured to:

receive information relating to the capabilities of the terminal in a message mLVAP-CrRq requesting creation of a virtual access point sent by the first physical access point, send to the first physical access point an order m1010pre to reconfigure the first connection, prior to the handover if the capabilities of the second physical access point are inferior to those of the first, send to the second physical access point an order m1010post to reconfigure the second connection, following the handover if the capabilities of the second physical access point are superior to those of the first.

The entities described and contained in the devices described with reference to FIGS. 4 and 5 may be hardware-based or software-based. FIGS. 4 and 5 illustrate just one among a plurality of possible ways of implementing the algorithm described in detail above with reference to FIG. 2. Specifically, the technique of the invention may be carried out equally well on a reprogrammable computing machine (a PC, a DSP or a microcontroller) executing a program comprising a sequence of instructions, as on a dedicated computing machine (for example a set of logic gates such as an FPGA or an ASIC, or any other hardware module).

If the invention is installed on a reprogrammable computing machine, the corresponding program (i.e. the sequence of instructions) will possibly be stored on a removable storage medium (such as for example a USB stick, a floppy disk, a CD-ROM or a DVD-ROM) or a non-removable storage medium, this storage medium being partially or completely readable by a computer or a processor.

The invention claimed is:

1. A managing method for managing handover of a terminal between a plurality of physical points of access to a Wi-Fi network, a virtual-access-point identifier dedicated to the terminal being assigned by a controller to a first physical access point, the terminal associating itself with the first physical access point via a first connection using the virtual-access-point identifier, the method comprising in the first access point:

transmitting, from the first physical access point to the controller, information relating to capabilities of the terminal;

receiving an order to hand over from the first connection to a second connection set up between the terminal and a second physical access point of the plurality using the same virtual-access-point identifier, the first and second connections being tailored to the capabilities of the terminal; and performing:
reconfiguring the first connection prior to the handover in response to capabilities of the second physical access point being inferior to those of the first physical access point; or
reconfiguring the second connection following the handover in response to capabilities of the second physical access point being superior to those of the first physical access point.

2. The managing method as claimed in claim 1, comprising extracting information relating to the capabilities of the terminal from a probe-request message sent by the terminal and received by the first physical access point.

3. The managing method as claimed in claim 1, wherein the information relating to the capabilities of the terminal is transmitted to the controller in a message requesting creation of a virtual access point.

4. The managing method as claimed in claim 1, comprising reconfiguring the first connection prior to the handover in response to the capabilities of the second physical access point being inferior to those of the first physical access point.

5. The managing method as claimed in claim 1, comprising reconfiguring the second connection following the handover in response to the capabilities of the second physical access point being superior to those of the first physical access point.

6. A method for controlling handover of a terminal between a plurality of physical points of access to a Wi-Fi network, a virtual-access-point identifier dedicated to the terminal being assigned by a controller to a first physical access point, the terminal associating itself with the first physical access point via a first connection using the virtual-access-point identifier, the method comprising in the controller:

receiving, from the first physical access point, information relating to capabilities of the terminal;

depending on a determined criterion, triggering handover from the first connection to a second connection set up between the terminal and a second physical access point of the plurality using the same virtual access point, the first and second connections being tailored to the capabilities of the terminal; and performing:
sending to the first physical access point an order to reconfigure the first connection, prior to the handover in response to capabilities of the second physical access point being inferior to those of the first physical access point; or
sending to the second physical access point an order to reconfigure the second connection, following the handover in response to capabilities of the second physical access point being superior to those of the first physical access point.

7. The control method as claimed in claim 6, wherein the information relating to the capabilities of the terminal is transmitted to the controller in a message requesting creation of a virtual access point sent by the first physical access point.

8. The control method as claimed in claim 6, comprising sending to the first physical access point an order to reconfigure the first connection, prior to the handover in response to the capabilities of the second physical access point being inferior to those of the first physical access point.

9. The control method as claimed in claim 6, comprising sending to the second physical access point an order to reconfigure the second connection, following the handover in response to the capabilities of the second physical access point being superior to those of the first physical access point.

10. A device for managing handover of a terminal between a plurality of physical points of access to a Wi-Fi network, a virtual-access-point identifier dedicated to the terminal being assigned by a controller to a first physical access point, the terminal associating itself with the first physical access point via a first connection using the virtual-access-point identifier, the device comprising:
- a receiver, a transmitter, a processor and a memory coupled to the processor with instructions that when executed by the processor configure the device to:
- transmit, from the first physical access point to the controller, information relating to capabilities of the terminal;
- receive an order to hand over from the first connection to a second connection set up between the terminal and a second physical access point of the plurality using the same virtual-access-point identifier, the first and second connections being tailored to the capabilities of the terminal; and
- performing:
  - reconfiguring the first connection prior to the handover in response to capabilities of the second physical access point being inferior to those of the first physical access point; or
  - reconfiguring the second connection following the handover in response to capabilities of the second physical access point being superior to those of the first physical access point.

11. A device for controlling handover of a terminal between a plurality of physical points of access to a Wi-Fi network, a virtual-access-point identifier dedicated to the terminal being assigned by a controller to a first physical access point, the terminal associating itself with the first physical access point via a first connection using the virtual-access-point identifier, the device comprising:
- a receiver, a transmitter, a processor and a memory coupled to the processor with instructions that when executed by the processor configure the device to:
- receive, from the first physical access point, information relating to capabilities of the terminal;
- store said information in the memory;
- depending on a determined criterion, trigger handover from the first connection to a second connection set up between the terminal and a second physical access point of the plurality using the same virtual access point, the first and second connections being tailored to the capabilities of the terminal; and
- performing:
  - sending to the first physical access point an order to reconfigure the first connection, prior to the handover in response to capabilities of the second physical access point being inferior to those of the first physical access point; or
  - sending to the second physical access point an order to reconfigure the second connection, following the handover in response to capabilities of the second physical access point being superior to those of the first physical access point.

12. A non-transitory data medium readable by a first physical access point of a Wi-Fi network, and comprising instructions of a computer program stored thereon which when executed by a processor of the first access point configure the first access point to perform a method for managing handover of a terminal between a plurality of physical points of access to a Wi-Fi network, a virtual-access-point identifier dedicated to the terminal being assigned by a controller to the first physical access point, the terminal associating itself with the first physical access point via a first connection using the virtual-access-point identifier, the method comprising:
- transmitting, from the first physical access point to the controller, information relating to capabilities of the terminal;
- receiving an order to hand over from the first connection to a second connection set up between the terminal and a second physical access point of the plurality using the same virtual-access-point identifier, the first and second connections being tailored to the capabilities of the terminal; and
- performing:
  - reconfiguring the first connection prior to the handover in response to capabilities of the second physical access point being inferior to those of the first physical access point; or
  - reconfiguring the second connection following the handover in response to capabilities of the second physical access point being superior to those of the first physical access point.

13. A non-transitory data medium readable by a controller and comprising instructions of a computer program stored thereon which when executed by a processor of the controller configure the controller to perform a method for controlling handover of a terminal between a plurality of physical points of access to a Wi-Fi network, a virtual-access-point identifier dedicated to the terminal being assigned by the controller to a first physical access point, the terminal associating itself with the first physical access point via a first connection using the virtual-access-point identifier, the method comprising:
- receiving, from the first physical access point, information relating to capabilities of the terminal;
- depending on a determined criterion, triggering handover from the first connection to a second connection set up between the terminal and a second physical access point of the plurality using the same virtual access point, the first and second connections being tailored to the capabilities of the terminal; and
- performing:
  - sending to the first physical access point an order to reconfigure the first connection, prior to the handover in response to capabilities of the second physical access point being inferior to those of the first physical access point; or
  - sending to the second physical access point an order to reconfigure the second connection, following the handover in response to capabilities of the second physical access point being superior to those of the first physical access point.

* * * * *